//

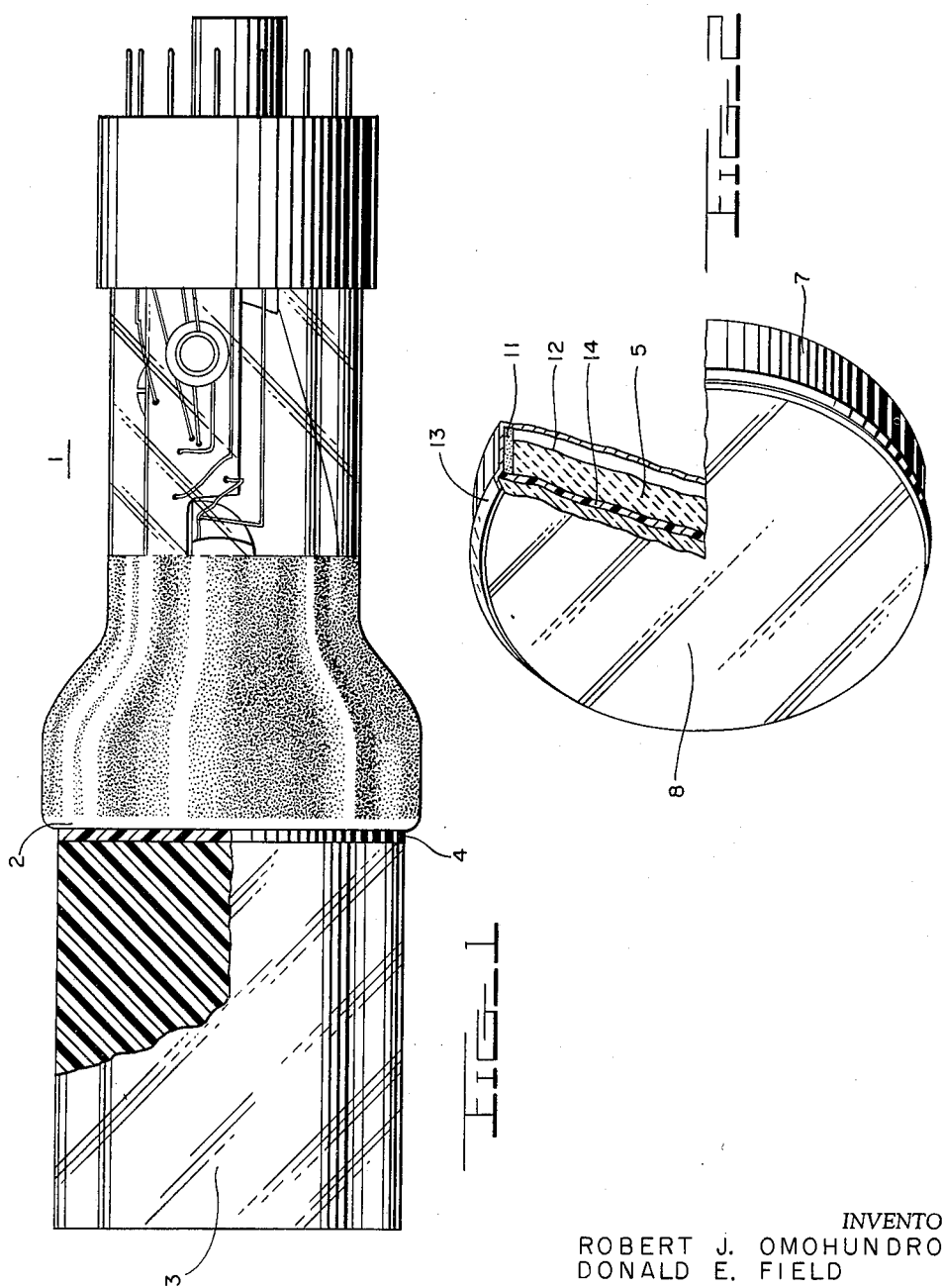
INVENTORS
ROBERT J. OMOHUNDRO
DONALD E. FIELD
BY Richard C Reed
ATTORNEY

United States Patent Office 3,087,060
Patented Apr. 23, 1963

3,087,060
SCINTILLATION COUNTER
Robert J. Omohundro, 1504 Lawrence St. NE., Washington, D.C., and Donald E. Field, 3419 S. Utah St., Arlington, Va.
Filed June 30, 1959, Ser. No. 824,157
7 Claims. (Cl. 250—71.5)
(Granted under Title 35, U.C. Code (1952), sec. 266)

The invention described herein may be manufactured and used by or for the Government of the United States of America for governmental purposes without the payment of any royalties thereon or therefor.

This invention relates to a scintillation counter and in particular to a scintillation counter in which a new cement composition provides good optical coupling of the scintillator to the photomultiplier tube and also to glass, quartz and other transparent cover plates.

Many coupling media commonly used in the interface between a scintillator and a photomultiplier tube have reasonably good optical properties, but the seal between them tends to loosen or become optically marred by areas of separation and by gradual loss of coupling medium. Such defects at the junction usually result from the use of fluid or viscous type optical coupling media, for instance, Nujol heavy mineral oil and ophthalmological petrolatum which gradually ooze or seep out from the interface. Adhesive type materials that heretofore have been used to affix tube and scintillator invariably have poorer light transmission properties than the viscous and fluid media, and such more or less permanent type adhesives have the particular disadvantage that they deprive the use of scintillator or photomultiplier tube in other experimental setups. With permanent type adhesives, if either tube or scintillator becomes defective, the entire assembly becomes useless.

It is the object of the present invention to provide a scintillation counter that employs an optical cement for coupling the scintillator to a photomultiplier tube and for coupling the scintillator to glass, quartz and other transparent cover plates, in which said optical cement is superior to coupling media of the prior art.

It is another object of the present invention to provide a coupling cement for scintillation counters in which the coupled scintillation assemblies containing the present cement have good light-transmitting properties and longer operable life.

It is a further object of the invention that the novel cement for scintillators form a strong permanent bond between the coupled parts, requiring no other means of attachment, and in which the mounted scintillators perform efficiently as long as required. It is also an object of the invention to provide for separation of scintillator and photomultiplier by a simple nondestructive method that leaves both tube and scintillator intact and ready for further use.

These and other objects and advantages will become apparent from the following detailed description taken in conjunction with the accompanying drawing in which—

FIGURE 1 shows a scintillation counter comprising a scintillation phosphor cemented to the coupling window of a photomultiplier tube; and FIGURE 2 shows a mounted type crystal which is cemented to an optical coupling window.

In accordance with the present invention a scintillation counter is provided with a durable, transparent coupling cement at the interface between the scintillation phosphor and the optical window of a multiplier tube to form a convenient and effective mounting. The stable, solid cement composition affixes the scintillator firmly to the glass window of the tube and provides an optical medium and a strong supporting means that will not slip or become loosened by vibrations, blows or temperature variations. The cement composition consists of an epoxy resin, namely the polyepoxide of glycerol and epichlorohydrin; said epoxy resin is mixed with a diamine hardener at the time of use, and after a certain time interval, the mixture hardens into a clear solid cement with desired optical and coupling properties.

The polyepoxide which has been found suitable for the present invention contains the condensation product of glycerol and epichlorohydrin reacted in the presence of an acid-acting compound as catalyst thereof, for instance, stannic chloride, $SnCl_4$ or boron trifluoride, $BF_3$. The proportion of reactants is about one mole of epichlorohydrin for each molecular equivalent of hydroxyl group in the glycerol, and more particularly, the reaction mixture contains about 1 mole of glycerol to about 3 moles of epichlorohydrin. The polyepoxide is a pale amber, viscous liquid having an epoxide value of about .660 equivalence per 100 grams and a refractive index at 25° C. of 1.478. A suitable epoxy type resin, which by way of example may be used to form the present cement, is the Epon 1062 or (562) manufactured by the Shell Chemical Company.

A firmly hardening and good adhering cement is formed by adding one part by weight of a diamine, preferably, a distilled 1,2-propanediamine, to about ten parts by weight of an epoxy resin of the type that is referred to herein. Initially this mixture is a liquid but hardens gradually in about 8 hours at room temperature to a clear, non-brittle solid. If practical grade 1,2-propanediamine is to be used, it is preferably distilled from a drying agent, such as, sodium hydroxide pellets, and the distilled compound is then stored over sodium hydroxide pellets. The 1,2-propanediamine has been selected as the cement hardener because of its stability to light.

Turning now to the drawing with reference to FIGURE 1, photomultiplier tube 1 has an optical coupling window 2 which in the present embodiment forms the glass envelope of the tube and which may consist of fused quartz, "Lustraglass," "Vycor" (trade names of high silica glass) or other glass transparent to the light emitted by the scintillation plastic or phosphor 3. In other scintillation counter arrangements, a glass substitute, such as polymethyl methacrylate, may form the optical coupling window of the detecting tube. The scintillator 3, shown in FIGURE 1, may by way of example consist of polyvinyl toluene which is manufactured specifically as a scintillating plastic, and is a highly transparent, colorless, inert solid, free from air bubbles and interfering particles. The cement composition 4 at the interface or junction of scintillating plastic 3 and the optical window of the tube 1 is highly exaggerated in the drawing for purposes of illustration.

The coupling cement used in the present invention is also suitable for crystal mountings of the type which are "potted" in moisture-tight containers, as shown in FIGURE 2. Crystals that are readily affected by atmospheric conditions must be protected from moisture, deleterious gases and fluids and are, consequently, mounted and sealed in the manner shown in FIG. 2. A phosphor crystal 5 such as a sodium iodide crystal activated with thallium metal, NaI(TI), is mounted and hermetically sealed in a container 7, commonly a thin-wall aluminum can or other suitable metal, having an open end to which an optical cover plate 8 is inserted. A narrow flange 13 provides supporting and sealing means for the cover plate. The crystal is sealed and optically coupled to the cover plate by means of a thin layer of the present cement composition between the crystal 5 and the cover plate 8, the thickness of said cement layer is exaggerated at 14 for purposes of illustration. The rear edge 12 of the crystal is usually provided with a reflector coating, such as $Al_2O_3$; the lateral space 11 and in some instances the space in back of the crystal may be filled with a non-absorbent material, for example, packed alumina ($Al_2O_3$) is found suitable for this purpose.

In applying the cement composition, the parts to be cemented are thoroughly cleaned to remove all foreign material, a freshly prepared cement mixture of 10 parts epoxy resin and one part 1,2-propanediamine by weight is applied to both surface areas and the parts are then pressed firmly together to squeeze out all excess cement from the junction. Normally not more than about .001 in. of cement remains in a properly coupled assembly, although the exact amount of hardened cement present is not critical for successful operation of counters, spectrometers and other devices which may employ coupled assemblies of the type described herein. The coupled parts are allowed to harden in about 8 hours to a clear, nonbrittle solid. While the cement is ordinarily employed at room temperature, the hardening thereof may be effected in a shorter period, if this is desired, by heating the cemented parts to a temperature as high as 50° C.

The refractive index of the present cement composition is about 1.502 (at the wavelength of the sodium D line) and this is especially desirable in view of the fact that a nearly linear transmittance of light occurs between plastic and glass or between crystal phosphor and glass. Light and other radiation is transmitted more efficiently through adjacent surfaces of materials having the same or nearly the same refractive index. Other transparent cement compositions which appear relatively transparent have been rejected as optical coupling cements because of such high indices of refraction that the light output is low due to internal reflection.

The polyepoxide-diamine cement composition may be used successfully in coupling glass to glass, glass to plastic a crystal composition to glass or any phosphorescent or fluorescent material suitable for radiation detectors, gamma-ray spectrometers, etc. may be optically coupled to form an extremely durable bond. The present cement is desirably free from flow or creeping effects common with viscous fluids or semi-solid type coupling media. It is also non-reactive with crystals, plastic phosphors or with quartz. The bonded parts will not separate during the course of operation or become optically marred with areas of partial separation. If either the tube or scintillator should become defective with use, the coupled parts may be separated by allowing water to flow rapidly across the junction or bonded area so that the bond may be dissolved by water. The present epoxide-diamine cement has the desirable property of being water soluble and the bonded area may be partially dissolved to the point where the bonds between the coupled parts are weakened and separation occurs. For more rapid results a scintillator material which is not deliquescent or water soluble is submerged in warm agitated water about 40° C. in the assembled parts may be separated in a relatively short time.

Water soluble crystals enclosed in metal frames, as shown in FIGURE 2 are separated as a unit from the coupled detector tube, although the crystal element 5 is of course not removed from its cover plate 7 in this manner. It is axiomatic that mounted crystals which employ the present composition do not loosen or become partially separated in time which commonly occurs with an oil or grease coupling medium. Fluids which have been employed as coupling media usually seep through the sealer, and areas of separation appear between the cover plate and the crystal. Mounted crystals therefore that employ the present cement composition have considerably longer operable life.

Scintillation assemblies that are coupled with the epoxy resin and diamine cement in accordance with the teachings of the present invention when compared with scintillators that employ heavy mineral oil or ophthalmological petrolatum demonstrate a considerable improvement over the previous devices. For purposes of comparison, crystal scintillators were mounted to a photomultiplier tube with three different coupling media: (1) polyepoxide-diamine cement of the present invention, (2) Nujol heavy mineral oil, and (3) ophthalmological petrolatum and the coupled assemblies were then inserted in a scintillation counter to determine the pulse height performance in each instance. The polyepoxide-diamine cement and the mineral oil produced pulse heights higher than those obtained with the ophthalmological petrolatum. Essentially identical pulse height data were obtained for the present cement composition and the mineral oil with standard mounted sodium iodide crystals activated with thallium metal, 1¾ in. dia. by ½ in. long, with the same mounted crystal in a Lucite light pipe and also with polyvinyl toluene phosphor 1¾ in. diameter by 1¾ in. long. However, when a sodium iodide crystal activated with thallium is mounted with the present cement composition, it shows considerable improvement in pulse heights that were as much as 20% higher than the standard mounted NaI(Tl) crystals that contain fluid media.

Various modifications are contemplated and may obviously be resorted to by those skilled in the art without departing from the spirit and scope of the invention, as hereinafter defined by the appended claims, as only preferred embodiments thereof have been disclosed.

What is claimed is:

1. A scintillation counter having an optical detecting element and a scintillator, a radiation transparent window in said element, a light-transmitting surface on said scintillator, said detecting element being bonded to said scintillator by a thin layer cement at the interface between said window and said surface, said cement being formed with a liquid epoxide and a diamine hardener, said epoxide being the condensation product of glycerol and epichlorohydrin.

2. A scintillation counter as claimed in claim 1 in which said cement consists of the condensation product of glycerol and epichlorohydrin in a mole ratio of about 1 to 3, respectively, and of 1,2-propanediamine.

3. A scintillation counter having a photomultiplier tube and a scintillation phosphor, said photomultiplier tube being bonded to said phosphor by a thin layer cement at the interface between said tube and said phosphor, said cement being formed with 10 parts by weight of the condensation product of glycerol and epichlorohydrin and 1 part by weight of 1,2-propanediamine, as the hardener therein.

4. A scintillation counter as claimed in claim 3 in which said product has an epoxide value of about 0.660 equivalence per 100 grams.

5. A radiation detector comprising a photomultiplier tube, a crystal phosphor and a detecting circuit including said tube, said crystal phosphor being bonded to said tube by a thin layer cement, said cement being formed with 10 parts by weight of a liquid epoxide and 1 part by weight of 1,2-propanediamine, said epoxide being the condensation product of glycerol and epichlorohydrin.

6. A scintillation phosphor comprising a crystal element enclosed in a radiation permeable envelope, a window in said envelope having a transparent cover plate mounted thereto for transmitting light through said envelope, a light-transmitting surface of said element in close proximity to said plate, a cement layer bonding said plate to said surface of said element, said cement being formed with a liquid epoxide and a diamine hardener, said epoxide being the condensation product of glycerol and epichlorohydrin.

7. A scintillation phosphor comprising a crystal enclosed in a radiation permeable container, a window in said container having a transparent cover plate sealed thereto for transmitting light through said container, a light-transmitting surface of said crystal in close proximity to said plate, a cement layer bonding said plate to said surface of said crystal, said cement consisting of 10 parts by weight of the condensation product of glycerol and epichlorohydrin and 1 part by weight of 1,2-propanediamine.

References Cited in the file of this patent

UNITED STATES PATENTS

| | | |
|---|---|---|
| 2,500,600 | Bradley | Mar. 14, 1950 |
| 2,506,486 | Bender et al. | May 2, 1950 |
| 2,642,412 | Newey et al. | June 16, 1953 |
| 2,727,154 | Goldsworthy | Dec. 13, 1955 |
| 2,786,794 | Gams | Mar. 27, 1957 |
| 2,855,520 | Stoddard et al. | Oct. 7, 1958 |
| 2,868,767 | Cyba | Jan. 13, 1959 |
| 2,909,448 | Schroeder | Oct. 20, 1959 |

FOREIGN PATENTS

| | | |
|---|---|---|
| 732,893 | Great Britain | June 29, 1955 |

OTHER REFERENCES

Epoxy Resins in Glass-Cloth Laminates by Silver et al., Modern Plastics, vol. 28, No. 3, pages 113, 114, 116, 118, 120 and 122, November 1950.